Figure 6:
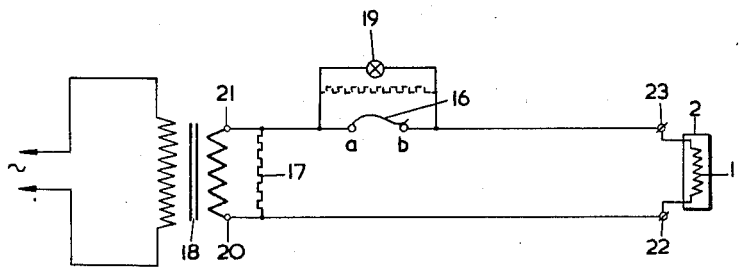

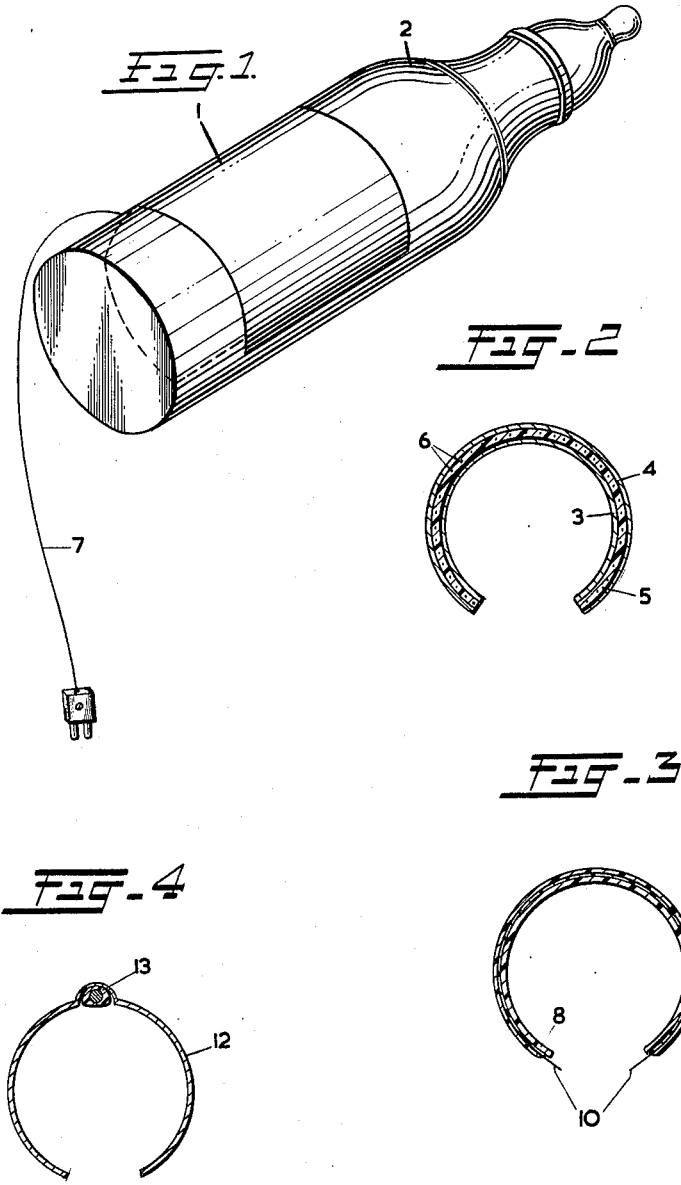

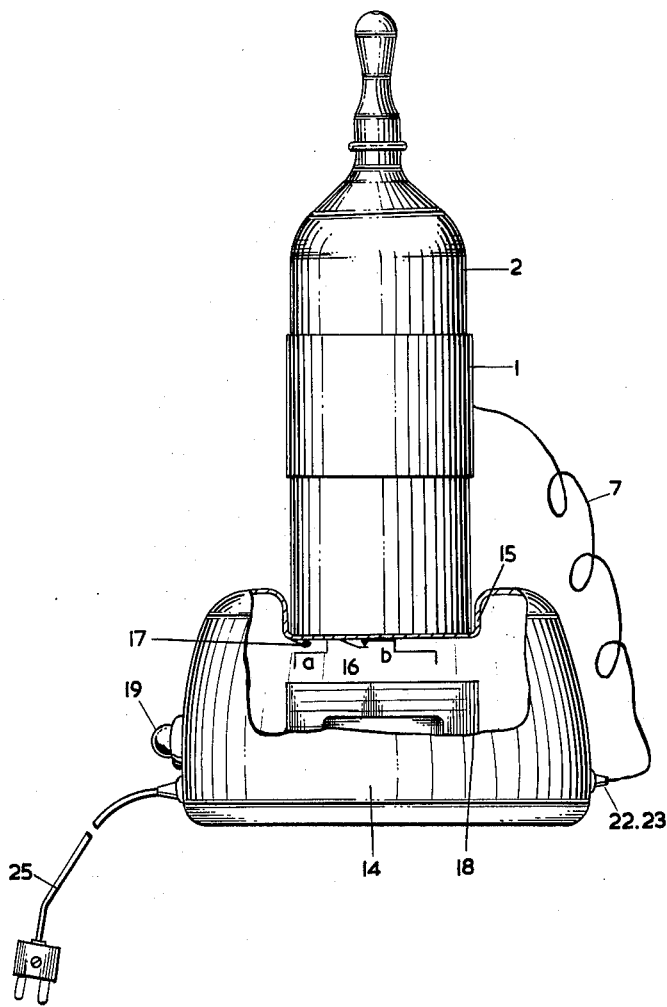

Jan. 25, 1966  M. VAN DEN BOSCH  3,231,716
ELECTRICAL HEATING DEVICE FOR WARMING UP AND MAINTAINING THE
TEMPERATURE OF A NURSING BOTTLE
Filed Sept. 18, 1962  3 Sheets-Sheet 3

INVENTOR.
MATHIJS VAN DEN BOSCH
BY
ATTORNEYS

United States Patent Office 3,231,716
Patented Jan. 25, 1966

1

3,231,716
ELECTRICAL HEATING DEVICE FOR WARMING UP AND MAINTAINING THE TEMPERATURE OF A NURSING BOTTLE
Mathijs van den Bosch, 521 Laan van Meerdervoort, The Hague, Netherlands
Filed Sept. 18, 1962, Ser. No. 224,902
Claims priority, application Netherlands, Sept. 21, 1961, 269,460; France, Jan. 25, 1962, 885,968
6 Claims. (Cl. 219—433)

The invention relates to a device for warming up and maintaining the temperature of the contents of a feeding bottle and the like said device consisting of a cylindrical jacket to be fitted round the bottle and containing an electric heating element.

U.S. patent specification 2,500,214 describes a feeding bottle heater which remains round the bottle during feeding. This heating device is constructed in the form of a double-walled sleeve divided longitudinally into two halves which are pivotally connected with each other. Incorporated in the wall are the heating coil as well as the requisite bimetallic thermostat.

It is no doubt particularly desirable that it should be possible even during the feeding of the baby, which may sometimes take a comparatively long time, to warm the contents of the bottle continuously, since the drinking of contents that is too cold is harmful. The known device, however, presents a number of disadvantages which have so far barred its general use. Thus the thermostat has to be accommodated in a very cramped space and yet has to be accurate, the construction is complicated and not cheap, only one particular size of feeding bottle can be used, and the contents of the bottle cannot be observed during warming-up and feeding.

The object of the invention is to furnish a heating device to be left round the bottle during feeding, which device does not have the above-mentioned disadvantages and with which it is in particular impossible for the temperature of the contents of the bottle to rise to a dangerous value. The invention is based on the discovery that when the heating device consists of a sheet-shaped heating element fitting snugly round the bottle, the relation between the area of the sheet and the power supplied to the heating element being suitable, the temperature of the sheet owing to the cooling that is effected by the surrounding air will be stabilized at a particular value, while the temperature of the contents of the bottle, irrespective of the amount of the contents, will also keep this value. The heating power required for this is too small to effect rapid warming-up of the contents of the bottle; for this reason, the warming-up takes place while the bottle is placed in a special holder, which holder contains a thermostatic switch which responds to the temperature of the bottom of the bottle and which is connected in such a way that the bottle is at first rapidly warmed to the required temperature with an increased heating power, after which the changeover of the thermostat results in the power supplied to the heating element round the bottle being lowered to a value which is sufficient to maintain the temperature reached.

The device according to the invention, therefore, comprises a holder for accommodating the feeding bottle during the warming-up of the contents of the bottle, which holder, in a place warmed by the feeding bottle, is equipped with a thermostatic switch which is included in the circuit of the heating element and which reduces the heating current when the desired final temperature has been reached, while the power then supplied to the heating element, dependent on the area of the sheath of the heating element, which has the form of an elastic, curved sheet, is so chosen that the temperature of the contents

2 of the bottle is stabilized at the desired value, largely irrespective of the amount of these contents.

With a view to the reduction of the power supplied to the heating element when the temperature of the contents of the bottle has reached the desired value, the thermostatic switch may be constructed in the form of an on-off switch which, when the desired temperature is reached, opens its contacts, which contacts are bridged by a resistor or an incandescent lamp, or a combination of the two, the resistance of which is so chosen that the power taken up by the heating element when the thermostat contacts are opened is sufficient to maintain the temperature reached.

It is of course also possible to construct the thermostatic switch in the form of a change-over switch by means of which the heating element is switched over, when the desired temperature is reached, to a supply voltage which is lower than the voltage applied during warming-up and is sufficient to ensure the maintenance of the temperature reached.

In order to avoid the possibility that, after the removal of the feeding bottle, the temperature of the holder should fall to such a value that the thermostat switches on the full heating power again, a resistor fitted in the vicinity of the thermostat has been provided, which is permanently connected to the supply voltage and has such a value that the heat radiated by it is sufficient to keep the thermostat in the changed-over position while the feeding bottle is removed from the holder.

The power for the heating element will preferably be supplied by a transformer. The holder may be cup-shaped, the thermostatic switch being attached to the bottom and the transformer also being fitted in the holder.

With reference to the annexed figures the invention will now be explained more fully. Of these figures, FIG. 1 shows the overall shape of the heating element, fitted round a feeding bottle; FIG. 2 is a cross-section of the heating element; FIGS. 3 and 4 are also cross-sections of two other embodiments of it; FIG. 5 shows a feeding bottle equipped with a heating element, placed in the accessory holder; FIG. 6 shows the wiring diagram of the device, while FIGS. 7 and 8 finally show the wiring diagram of variants of the connections according to FIG. 6.

As appears from FIG. 1, the heating element or sleeve 1 is constructed in the form of a curved, comparatively thin sheet, which is elastic and can be clamped round the bottle 2. As FIG. 2 shows, this sheet is double-walled, and a heating wire 6 embedded in insulating material 5 is provided in the space between the walls 3 and 4. This heating wire is connected to the connecting cord 7.

The heating element may of course also be constructed in other ways; thus it may, for instance, as shown in FIG. 3, consist of an insulating underlayer 8 on which is placed a thin film 9 of conductive material, provided with connecting wires 10 and covered with a second insulating layer 11. The heating element may also be constructed in the form of a single thin and elastic sheet 12 of properly heat-conducting material, as shown in FIG. 4, to which sheet is attached a cylindrical heating element 13.

The heating element may have a length equal to half that of the commonly used feeding bottles. In this way it is possible to observe the contents of the bottle during feeding and the heating element can be pushed round the part of the bottle containing the feed.

The fact that the heating element is elastic makes it possible to employ it with feeding bottles of practically any existing size and kind.

FIG. 5 shows the holder 14 used in combination with the heating element, which holder serves to warm up the contents of the bottle rapidly. This holder 14 is cup-shaped and has a countersunk portion 15, in which the feeding bottle is placed. Attached to the bottom of this countersunk portion is the thermostatic switch 16, as is also the resistor 17, the object of which will be described more fully below. In addition the holder contains a transformer 18, a pilot lamp 19, a connection 20 for the connecting flexible electrical connector cord 7, and a flexible electrical connector cord 25, by means of which the whole device is connected to the mains.

The way in which the various parts are electrically connected is shown in FIG. 6. The primary coil of the transformer 18 is connected to the mains; the end 20 of the secondary coil is directly connected to the terminal 22 of the heating element 1; the connection 21 is connected via the thermostatic switch 16 to the terminal 23 of the heating element 1. The pilot lamp 19 is connected in parallel to the contacts of the thermostatic switch 16a–b, while the resistor 17 is permanently connected to the terminals 20 and 21.

The device operates as follows: When the cold feeding bottle is placed in the holder, the contacts 16a–b of the thermostatic switch 16a–b are closed. Through the heating element 1 a current then flows which is of a magnitude such that rapid warming-up of the contents of the bottle is ensured. The temperature of the bottom of the bottle, and accordingly that of the countersunk portion 15 of the holder, rises; the thermostat 16 has been adjusted in such a way that, when this temperature reaches the desired value, the contacts 16a–b will be opened. The heating current will now flow through the pilot lamp 19 and thus, dependent on the capacity of this lamp, will be smaller than the initial warming-up current, but sufficient to maintain the contents of the bottle at the proper temperature. In a practically constructed embodiment the transformer furnishes a secondary voltage of about 12 volts, the heating sheet has a resistance of 4 ohms, and the pilot lamp is of the 8 v.–0.5 a. type parallel to which a resistance of 32 ohms is connected. The lamp will light up when the feeding bottle has the proper temperature, by which means the user is warned that the bottle is ready for use.

The transformer has such dimensions that an overload of 40 watts during about 6–10 minutes does no harm. The current through the heating element is during this short period 3A; the heating-up time therefore is very short. As soon as the contacts of the thermostatic switch open the current through the heating element is reduced to 0.75 a.; 0.5 a. flowing through the pilot lamp and 0.25 a. flowing through the shunting resistor (32 ohms).

As appears from the diagram of FIG. 6 the resistor 17 is permanently connected to the terminals 20 and 21, and thus will always carry current. The dimensions of this resistor are such that some heat is evolved, which, since the resistor is fitted against the bottom 15 of the holder 17, heats the thermostat 16. Now the device is adjusted in such a way that, when the thermostat is opened and the feeding bottle is removed, the heat evolved by the resistor 17 is sufficient to keep the thermostat opened. In this way the possibility is avoided that after the removal of the bottle the thermostat contacts should be closed again. However, when a cold feeding bottle is placed in the holder, it will withdraw from the bottom such an amount of heat that the thermostat will be closed again and rapid warming-up takes place.

It is, of course, possible to omit the resistor 17 when the pilot lamp is shunted by a resistor, as is the case in the above described example, by mounting this shunting resistor in the vicinity of the thermostatic switch.

The transformer employed can be adapted for operation at low current intensity, i.e. for maintaining the temperature of the bottle, since the rapid warming-up of the bottle takes place in so short a time that the transformer will not become too hot during this short over-loading.

Furthermore, when the transformer is overloaded for too long a period, for instance due to a failure of the thermostatic switch to open, the resulting heating of the transformer effects an extra heating-up of the thermostatic switch, forcing it to open is contacts.

Figure 7:
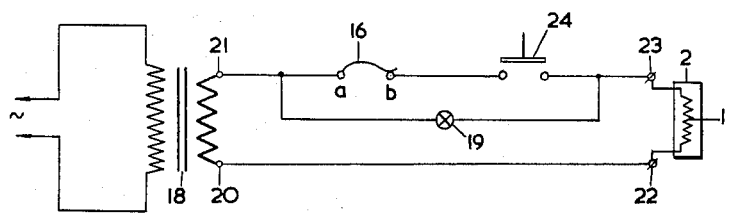
Figure 8:
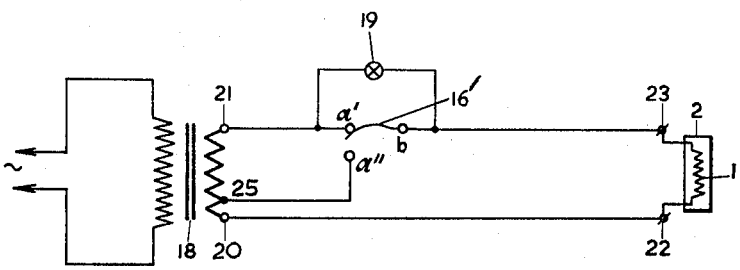

It is obvious that several variants of the wiring of the thermostat and heating element are possible. Thus the thermostatic switch may be constructed in the form of a change-over switch which, when the desired temperature is reached, connects the heating element to a branch of the secondary coil of the transformer. Such a circuit is shown in FIG. 8. When the thermostatic switch 16' is in the shown position, the contacts a' and b are interconnected and the full voltage present between the terminals 20 and 21 of the transformer 18 is applied to the heating element 1. When the desired temperature is reached the thermostatic switch 16' changes over, so that now the contacts a'' and b are interconnected. Thus a reduced voltage, taken from the terminals 20 and 25 of the transformer, is supplied to the heating element 1, so that the heating power is reduced. At the same time the voltage between the terminals 25 and 21 is supplied to the lamp 19 which lights, indicating that the desired temperature is reached. Furthermore it is possible to include in the holder a switch to be operated by the bottle, which switch is connected in series with the thermostatic switch and is opened when the bottle is removed. The resistor 17 can then be omitted. A wiring of this kind is shown in FIG. 7; the safety switch is indicated by the reference numeral 24.

What I claim is:

1. A bottle warming device comprising a mounting stand forming a holder for a bottle, first electrical heating means in said mounting stand for warming said bottle, a detached sleeve member having second heating means adapted to be positioned around the bottle, flexible electrical connection means extending between said second heating means in said sleeve member and said mounting stand permitting independent manipulation of said sleeve member and a bottle associated therewith, and means on said mounting stand for connecting said first and second heating means to a source of electrical current supply.

2. A bottle warming device comprising a mounting stand having a central recess for positioning and holding a bottle thereon, a first heating element contained in said mounting stand adjacent said recess, a detached sleeve element adapted to be positioned over a bottle held on said mounting stand, said sleeve element having a second electrical heating element thereon, a flexible electrical connector cord connected between said second heating element and said mounting stand permitting independent movement of said sleeve member in respect to said mounting stand, and means for supplying electrical current to said first heating element and to said second heating element through said connector cord including a transformer in said mounting stand having a secondary connected directly across said first and second heating means, said first and second heating elements being connected in parallel, a thermostatic switch connected between said first and second elements and carried by said mounting stand and responsive to the temperature of a bottle being heated, said switch being openable upon the reaching of a predetermined temperature and a light element having resistance means connected across said thermostatic switch and carrying current between said first and second heating element for disconnecting the supplying of at least a portion of the current to said second heating element when said switch is open.

3. A bottle warming device comprising a mounting stand forming a holder for a bottle, a detached sleeve member having an electric heating element adapted to be positioned around a bottle, means on said mounting stand for connecting said electrical heating element to a current supply line including a flexible electrical connection between said heating element and said stand, and a bimetallic switch connected to the current supply line and to said heating element and carried by said mounting stand and being responsive to the temperature of the bottle being heated to discontinue at least a portion of the current flow to said heating element after a predetermined temperature has been reached.

4. A bottle warming device comprising a mounting stand having a recessed top forming a holder for a bottle, a resistor in said mounting stand adjacent said recessed top, a detached sleeve member having an electric heating element adapted to be positioned around the bottle, means on said mounting stand for connecting said resistor and said electrical heating element to a current supply line including a flexible electrical connection between said heating element and said stand, and a bimetallic switch located adjacent said recessed top and responsive to the temperature of a bottle being heated and connected across the current supply line to the flexible electrical connection and said resistor and openable upon reaching a predetermined temperature to prevent at least a portion of current flow therethrough.

5. A bottle warming device comprising a mounting stand having a recessed top forming a holder for a bottle, a detached sleeve member having an electric heating element adapted to be positioned around a bottle, means on said mounting stand for connecting said electrical heating element to a current supply line including a flexible electrical connection between said heating element and said supply line, and a bimetallic switch connected to said current supply line and to the flexible electrical connection and being responsive to the temperature of the bottle being heated and being openable upon reaching a predetermined temperature to discontinue at least a portion of the current flow to said heating element, and light indicator means connected across said bimetallic switch and receiving current when said switch is opened.

6. A bottle warming device comprising a mounting stand having a recessed top forming a holder for a bottle, a detached sleeve member having an electric heating element adapted to be positioned around a bottle, means on said mounting stand for connecting said electrical heating element to a current supply line including a flexible electrical connection between said heating element and said supply line, and a bimetallic switch connected across the current supply line and to the flexible electrical connection and being responsive to the temperature of the bottle being heated to prevent a portion of the current flow to said heating element, a transformer connected across said electrical supply line and having a secondary connected to said bimetallic switch to said heating element and return to said secondary, and a secondary tap connected to said switch and supplying current of a lesser amount through said switch to said heating element when said switch is actuated after a predetermined temperature has been reached.

References Cited by the Examiner

UNITED STATES PATENTS

| | | | |
|---|---|---|---|
| 1,418,496 | 6/1922 | Van Dyke | 219—544 X |
| 1,455,287 | 5/1923 | Hadley | 219—528 |
| 1,657,479 | 1/1928 | MacFarland | 219—545 X |
| 1,830,221 | 11/1931 | Blue | 219—535 X |
| 2,025,302 | 12/1935 | Olds. | |
| 2,516,637 | 7/1950 | McCollum | 219—433 |
| 2,526,447 | 10/1950 | Aiken | 219—433 |
| 2,640,907 | 6/1953 | Morey | 219—433 |
| 2,680,190 | 6/1954 | Schmidt | 219—432 |
| 2,740,035 | 3/1956 | Young | 219—535 |

FOREIGN PATENTS

| | | |
|---|---|---|
| 463,996 | 8/1928 | Germany. |
| 601,272 | 5/1948 | Great Britain. |
| 632,063 | 11/1949 | Great Britain. |

ANTHONY BARTIS, *Acting Primary Examiner.*